(12) United States Patent
Tang et al.

(10) Patent No.: US 11,703,994 B2
(45) Date of Patent: *Jul. 18, 2023

(54) NEAR INTERACTION MODE FOR FAR VIRTUAL OBJECT

(71) Applicant: Microsoft Technology Licensing, LLC, Redmond, WA (US)

(72) Inventors: Sheng Kai Tang, Redmond, WA (US); Julia Schwarz, Redmond, WA (US); Thomas Matthew Gable, Seattle, WA (US); Casey Leon Meekhof, Redmond, WA (US); Nahil Tawfik Sharkasi, Woodinville, WA (US); Nicholas Ferianc Kamuda, Seattle, WA (US); Joshua Kyle Neff, Renton, WA (US); Alton Kwok, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,087

(22) Filed: Apr. 28, 2022

(65) Prior Publication Data

US 2022/0253199 A1 Aug. 11, 2022

Related U.S. Application Data

(63) Continuation of application No. 16/363,684, filed on Mar. 25, 2019, now Pat. No. 11,320,957.

(Continued)

(51) Int. Cl.
*G06F 3/04815* (2022.01)
*G06F 3/01* (2006.01)
(Continued)

(52) U.S. Cl.
CPC ..... *G06F 3/04815* (2013.01); *G02B 27/0093* (2013.01); *G02B 27/017* (2013.01); *G06F 3/017* (2013.01); *G02B 2027/0178* (2013.01)

(58) Field of Classification Search
CPC .......... G06F 3/011; G06F 3/013; G06F 3/017; G06F 3/04815; G06F 3/0482;
(Continued)

(56) References Cited

U.S. PATENT DOCUMENTS 9,109,921 B1* 8/2015 Furio ................. G01C 21/3664
2012/0113223 A1* 5/2012 Hilliges ................. G06F 3/011
348/46

(Continued)

*Primary Examiner* — Jennifer N Welch
*Assistant Examiner* — Ashley M Fortino
(74) *Attorney, Agent, or Firm* — Alleman Hall Creasman & Tuttle LLP

(57) ABSTRACT

A computing system is provided. The computing system includes a head mounted display (HMD) device including a display, a processor configured to execute one or more programs, and associated memory. The processor is configured to display a virtual object at least partially within a field of view of a user on the display, identify a plurality of control points associated with the virtual object, and determine that one or more of the control points associated with the virtual object are further than a predetermined threshold distance from the user. The processor is configured to, based on the determination, invoke a far interaction mode for the virtual object and receive a trigger input from the user. In response to the trigger input in the far interaction mode, the processor is configured to invoke a near interaction mode and display a virtual interaction object within the predetermined threshold distance from the user.

18 Claims, 11 Drawing Sheets

Related U.S. Application Data

(60) Provisional application No. 62/791,660, filed on Jan. 11, 2019.

(51) Int. Cl.
*G02B 27/00* (2006.01)
*G02B 27/01* (2006.01)

(58) Field of Classification Search
CPC ............ G06F 3/04842; G02B 27/0093; G02B 27/017; G02B 27/0172; G02B 2027/0178; G02B 2027/0138; G02B 2027/014
See application file for complete search history.

(56) References Cited

U.S. PATENT DOCUMENTS

2017/0277256 A1* 9/2017 Burns ..................... G06F 3/013
2017/0336863 A1* 11/2017 Tilton .................... G06F 3/011

* cited by examiner

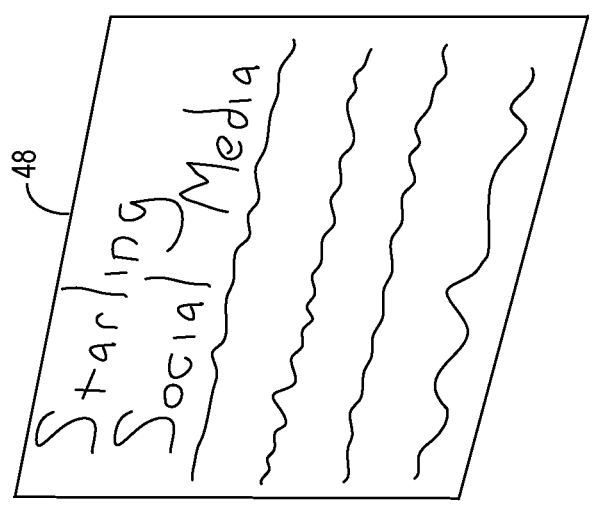
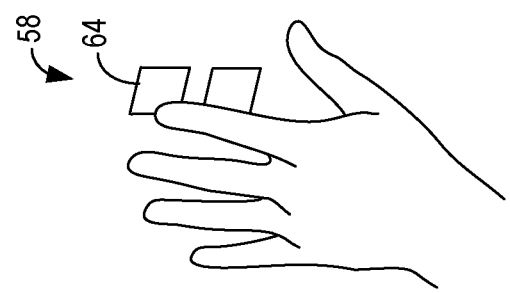
FIG. 6

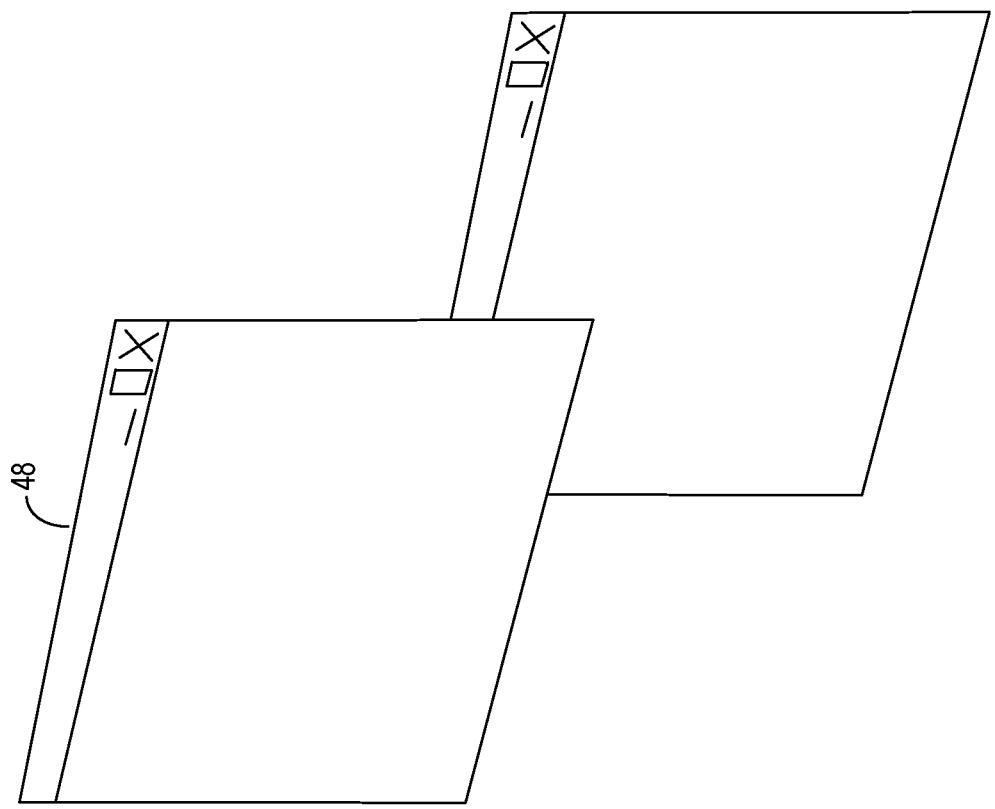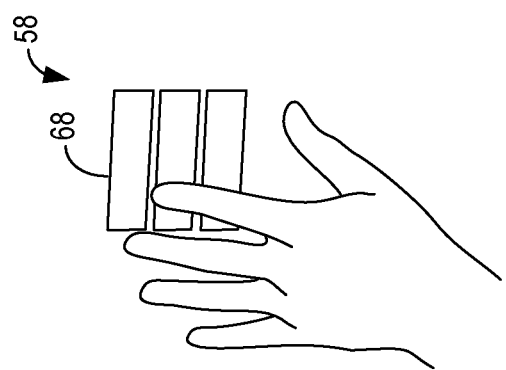
FIG. 7

NEAR INTERACTION MODE FOR FAR VIRTUAL OBJECT

CROSS REFERENCE TO RELATED APPLICATIONS

This application is a continuation of U.S. Non-Provisional patent application Ser. No. 16/363,684, filed Mar. 25, 2019, which claims priority to U.S. Provisional Patent Application Ser. No. 62/791,660, filed Jan. 11, 2019, the entirety of each of which is hereby incorporated herein by reference for all purposes.

BACKGROUND

An augmented reality (AR) or virtual reality (VR) environment may be populated with an array of virtual objects with which a user may interact. A user may issue vocal commands or execute gestures oriented toward user-interactive objects. An AR or VR system may need to be equipped with the capability to not only receive and interpret such commands and gestures, but control virtual objects as expected by the user. Objects that respond to user interaction in an intuitive and user-friendly manner may provide an improved experience for the user of the AR or VR system.

SUMMARY

A computing system is provided. The system may include a head mounted display device including a display and a processor and associated memory, the processor being configured to execute one or more programs stored in the memory. The processor may be configured to display a virtual object at least partially within a field of view of a user on the display. The processor may be further configured to identify a plurality of control points associated with the virtual object and determine that one or more of the control points associated with the virtual object are further than a predetermined threshold distance from the user. Based on the determination, the processor may be further configured to invoke a far interaction mode for the virtual object, and in the far interaction mode, receive a trigger input from the user. In response to receiving the trigger input in the far interaction mode, the processor may be configured to invoke a near interaction mode and display a virtual interaction object within the predetermined threshold distance from the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows an example implementation of the computing system of FIG. 1.

FIG. 7 shows an additional example implementation of the computing system of FIG. 1.

DETAILED DESCRIPTION

The inventors have recognized a challenge associated with user manipulation of virtual objects in a virtual reality (VR) or an augmented reality (AR) environment. A variety of methods may be employed for users to engage with virtual objects that appear at a distance from the user. Hand and arm gestures may be executed by a user to interact with distant objects, or a user interface (UI) may be invoked to facilitate user commands on distant objects. However, fine control of parts or points on distant objects may be challenging for a user. Also, a user interacting with a distant object may experience muscle fatigue if the interaction involves raised and/or extended hands and/or arms. Some types of interaction, such as scrolling or accessing a context menu, may even be impossible in situations where virtual content is displayed at a distance beyond the reach of a user. In consideration of these challenges, the inventors have conceived of a computing system that may facilitate user interaction with a distant object in an AR or VR environment by displaying a virtual affordance, or a virtual mechanism that may be an interface or handle for interacting with the distant object in a location that is proximal to the user.

Figure 1:
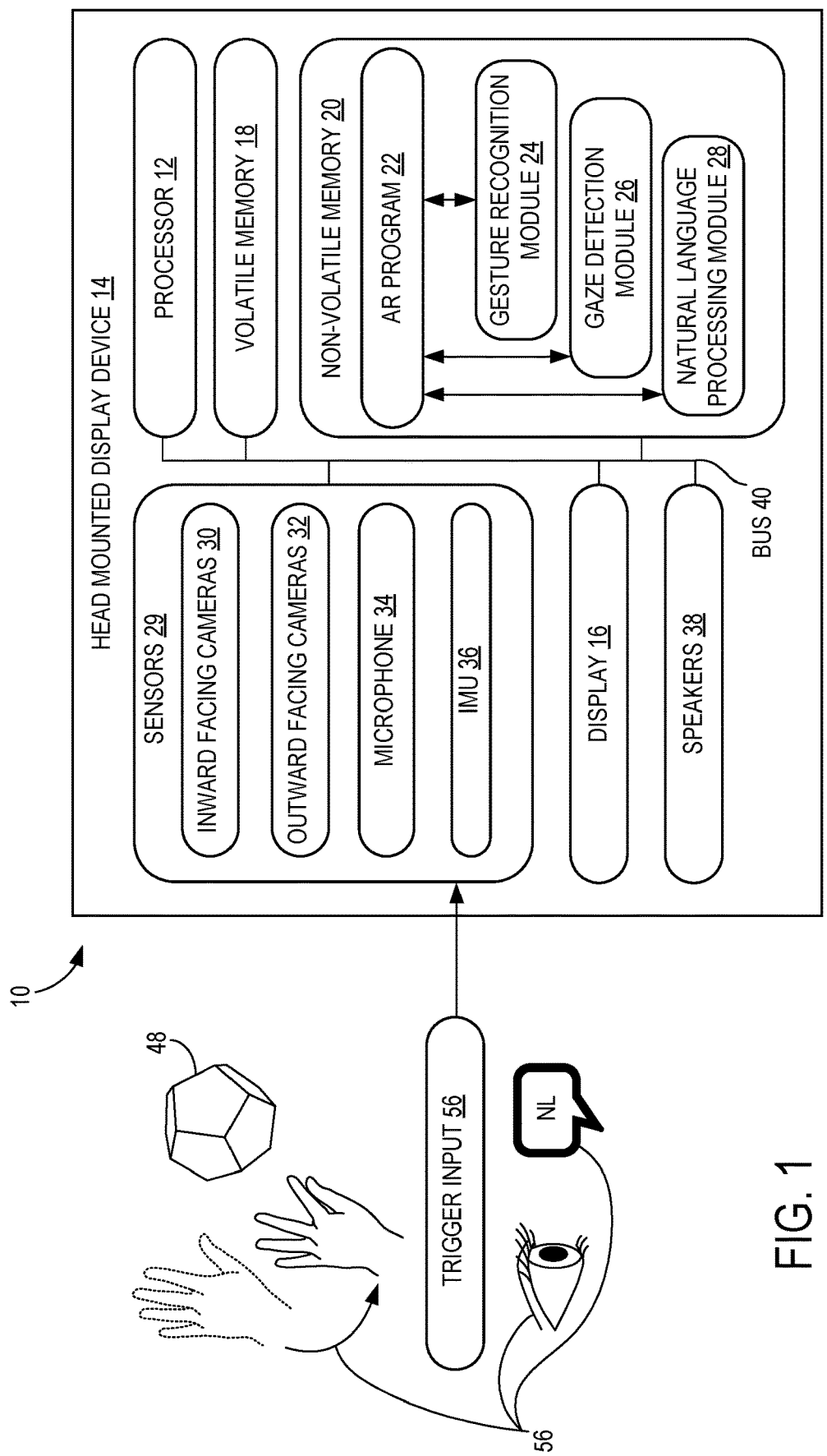
FIG. 1 shows a computing system according to an example implementation of the present disclosure.

FIG. 1 shows a computing system 10 according to an example implementation of the present disclosure. The computing system 10 may include a head mounted display (HMD) device 14 including a display 16 and a processor 12 and associated memory, the processor 12 being configured to execute one or more programs stored in the memory. The HMD device 14 may include volatile memory 18 that the processor 12 may use while executing the programs and non-volatile memory 20 for storage of the programs. The non-volatile memory 20 may store an AR program 22, a gesture recognition module 24, a gaze detection module 26, and a natural language processing (NLP) module 28 as shown in FIG. 1.

The gaze detection module 26 may be configured to process image data collected by inward facing cameras 30 to identify the position and orientation of each of a user's eyes and subsequently generate eye-tracking data. The gesture recognition module 24 may be configured to identify poses and gestures expressed by the user by processing image data of the user collected by outward facing cameras 32 when these cameras capture images of the user's body or portions thereof, such as the user's hands. The NLP module 28 may receive processed natural language (NL) input at a microphone 34, further processing the NL input by segmenting sentences, tagging parts of speech, and extracting commands and names of objects associated with the commands. The NLP module 28 may be a statistical machine translation model.

Also included in the HMD device 14 may be a plurality of sensors 29 of various types. The microphone 34 and an inertial measurement unit (IMU) 36, which in turn may include accelerometers, gyroscopes and/or a compass that can detect, for example, a 6 degree of freedom (6DOF) position and orientation of the display device 14. The processor 12 may further refine the 6DOF output of the IMU 36 using visual tracking systems that search for movement of identified visual features in a series of images captured by the outward facing cameras 32 and generate an estimate of the relative movement of the HMD device 14 based upon the movement of these visual features within successive image frames captured by the outward facing cameras 32 over time. The microphone 34 or one or more of the cameras 30, 32 may be integrated with the HMD device 14, or provided separately therefrom. The display 16 may be integrated with the HMD device 14, or optionally provided separately. Speakers 38 may be included in the HMD device 14, or also provided separately. It will be appreciated that these components may be connected via a data bus 40.

Figure 2:
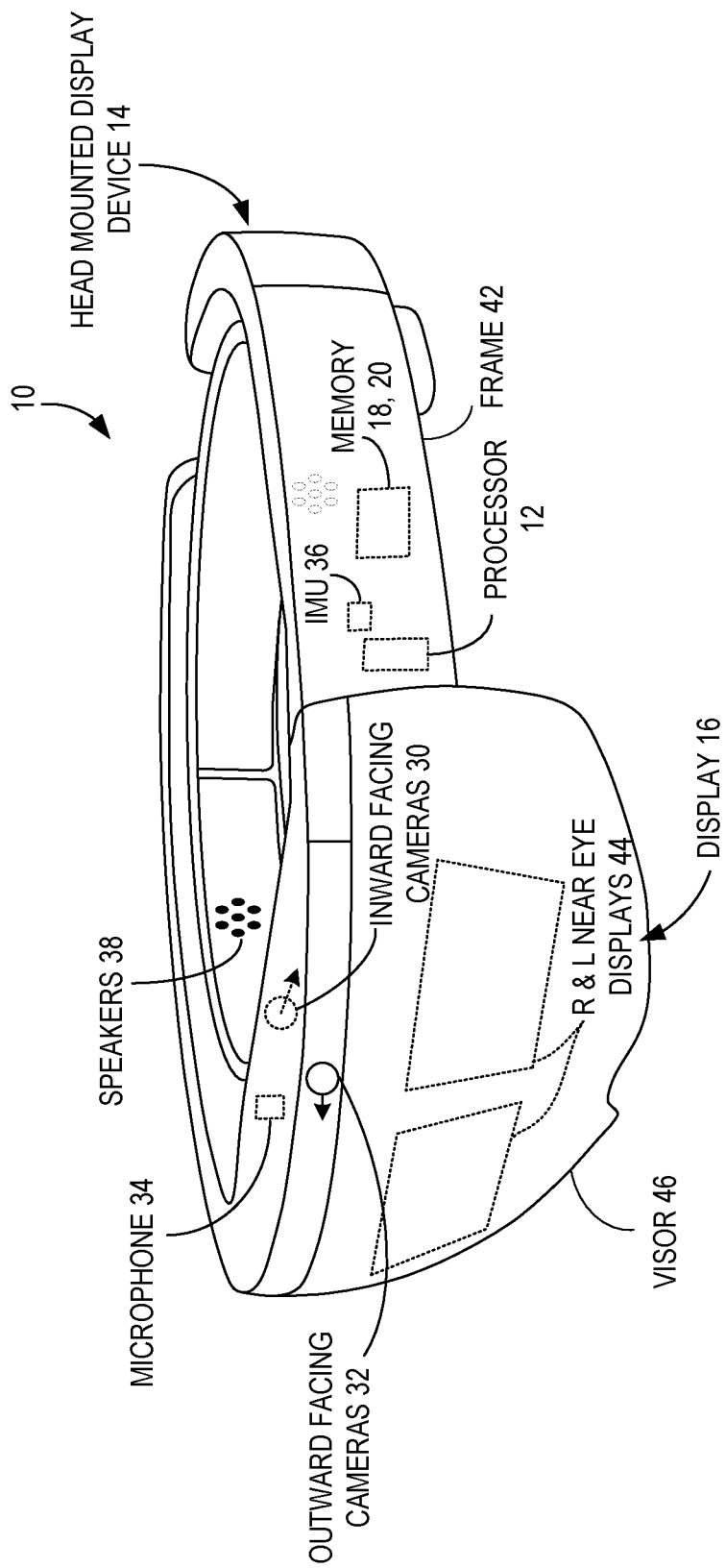
FIG. 2 is an example implementation of the computing system of FIG. 1 in a display device that is embodied in a head mounted display device.

As shown in FIG. 2, the computing system 10 may be embodied in the HMD device 14. The processor 12, volatile and non-volatile memories 18, 20, inward facing cameras 30, outward facing cameras 32, microphone 34, IMU 36, and speakers 38 may be incorporated within a housing of the HMD device 14 as shown. The HMD device 14 may include a frame 42 that at least partially encircles the head of a user, and the display 16 may include a pair of right and left near-eye displays 44. The near-eye displays 44 may be positioned behind a visor 46 through which a user may observe the physical surroundings in an AR system. It will be appreciated that the near eye displays 44 and visor 46 are at least partially transparent, enabling the user to see through these components to view the real environment, at least when content is not opaquely displayed on the near-eye displays 44.

Figure 3:
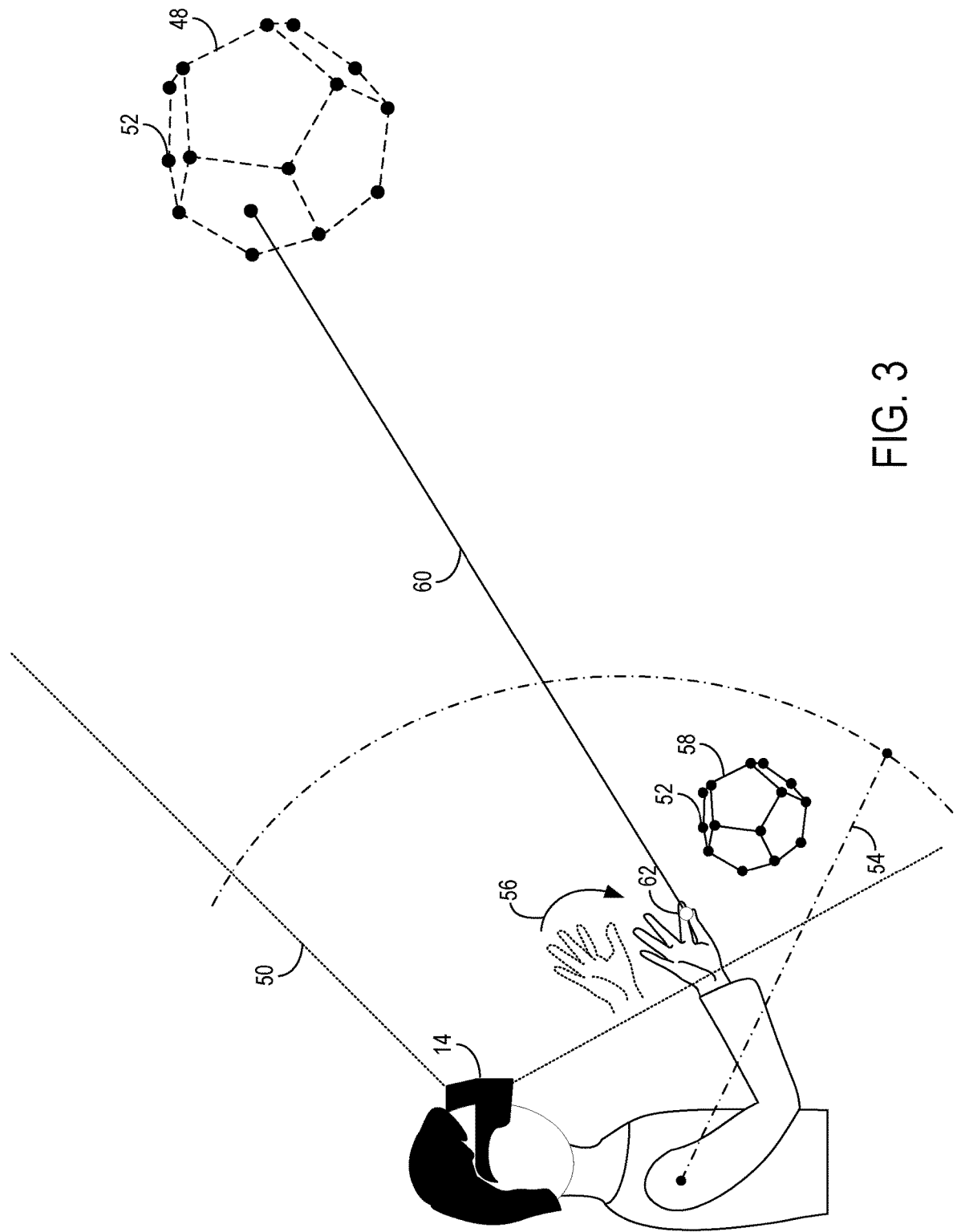
FIG. 3 shows a user interacting with the computing system of FIG. 1, according to one example of the present disclosure.

With reference to FIG. 3, the processor 12 may be configured to display a virtual object 48 at least partially within a field of view 50 of a user on the display 16. The processor 12 may be configured to identify a plurality of control points 52 associated with the virtual object 48 and determine that one or more of the control points 52 associated with the virtual object 48 are further than a predetermined threshold distance 54 from the user. For example, in FIG. 3, a dodecahedron is depicted as the virtual object 48. It may be observed that the control points 52 of the dodecahedron are all outside of the predetermined threshold distance 54 from the user. It will be appreciated that the distance 54 may be with respect to various parts of the user; FIG. 3 depicts the distance 54 measured with respect to the shoulder of the user. In other implementations the distance may be measured from another point on the body of the user.

Based on the determination, the processor 12 may be configured to invoke a far interaction mode for the virtual object 48. In the far interaction mode, the user may be able to perform a predetermined gesture, such as pointing at the virtual object 48, pinching, swiping, and so forth, for example, in order to select the virtual object 48. Selection of a virtual object 48 by way of a virtual ray 60 will be discussed in greater detail below. Typically, in the far interaction mode the available interactions with the virtual object 48 may be limited, and in some situations may only include selection, movement, resizing, and display of a far context menu due to the distance at which the virtual object is displayed. Movement and resizing of the virtual object 48 may be challenging to some degree because of the distance of interaction.

Figure 8:
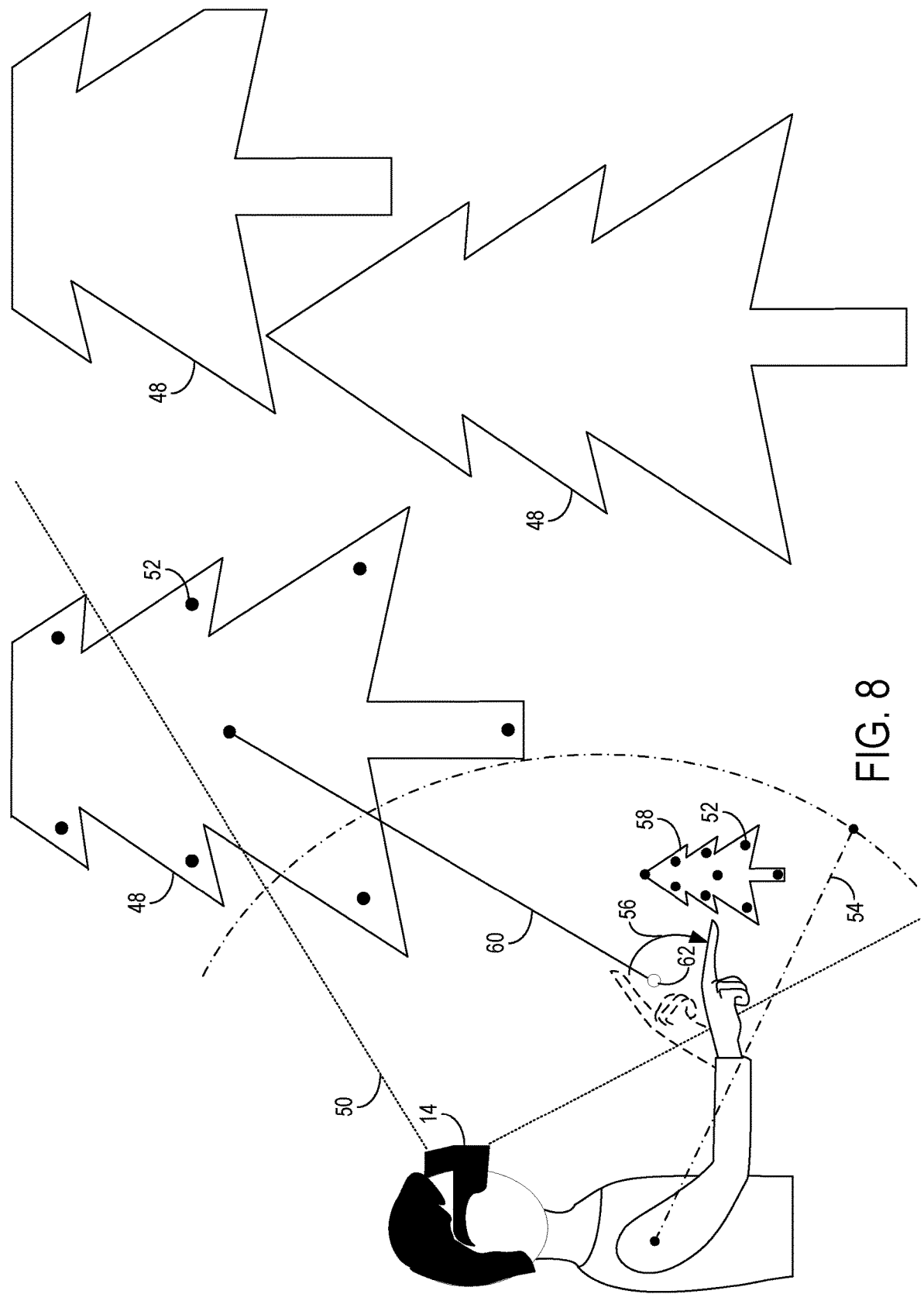
FIG. 8 shows a user interacting with the computing system of FIG. 1, according to another example of the present disclosure.

It will be appreciated that the virtual object 48 may be located such that a fraction or subset of the control points 52 are within the threshold distance 54; however, if the system 10 determines that the number of control points 52 outside of the distance 54 is greater than the predetermined threshold subset of control points 52, then the far interaction mode may be invoked. The predetermined threshold subset may be one control point, or a minimum percentage of control points, such as 10%, 25%, 50%, etc. The far interaction mode may be appreciated to be invoked under a condition where a significant number of control points 52 are beyond the reach of the user and thus may be difficult or tiresome for the user to control. One example is shown in FIG. 8, which is discussed in greater detail below.

In the far interaction mode, the processor 12 may be configured to receive a trigger input 56 from the user. As shown in FIG. 1, the trigger input 56 may be detected by one of the sensors 29 in the HMD device 14. The trigger input 56 may include at least one of a predefined gesture, a vocal command including natural language, a gaze direction, and/or eye movement, and thus be detectable by outward facing cameras 32, microphone 34, or inward facing cameras 30, respectively. In FIG. 3, a gesture of the user is the trigger input 56, which in this instance is depicted as a pinch gesture. In another example, the trigger input 56 may be a raised palm of the user, or alternatively a raised index figure of the user. It will be understood that numerous other trigger gestures may be possible, and may be associated with the context of the VR or AR environment.

Returning to FIG. 3, in response to receiving the trigger input 56 in the far interaction mode, the processor 12 may be configured to invoke a near interaction mode and display a virtual interaction object 58 within the predetermined threshold distance 54 from the user. In one specific example, the virtual interaction object 58 displayed in the near interaction mode may be a control widget 66. The control widget 66 may be a resized copy of the virtual object 48, and all control points 52 may be within the user's field of view 50 and within the predetermined threshold distance 54. FIG. 3 illustrates an example of this implementation, where the dodecahedron as a virtual object 48 is represented by a resized copy in the form of the virtual interaction object 58, the control points 52 within the predetermined threshold distance 54.

Figure 4A:
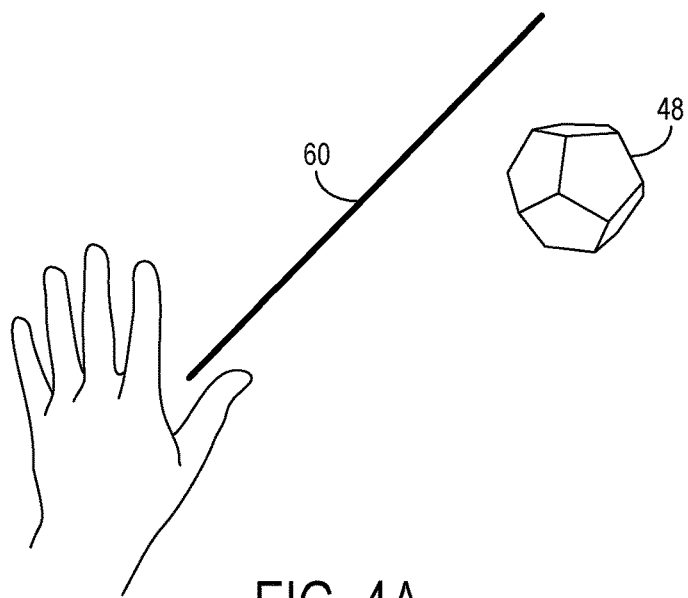
FIGS. 4A-4C show a hand of a user interacting with the computing system of FIG. 1, according to another example of the present disclosure.
Figure 4B:
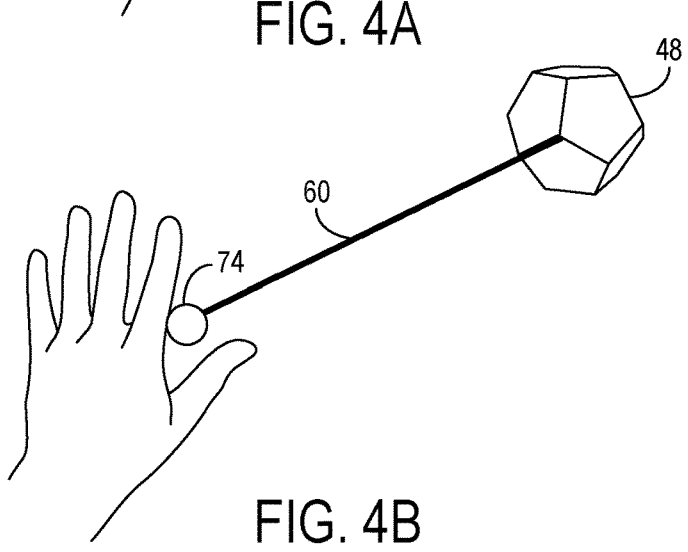
Figure 4C:
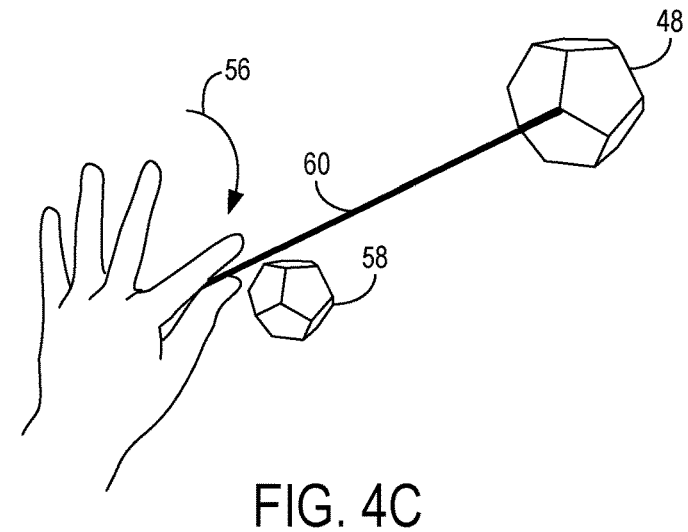
Figure 5A:
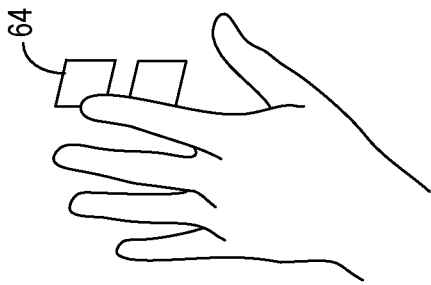
FIGS. 5A-5F show a plurality of interaction objects in the computing system of FIG. 1, according to another example of the present disclosure.
Figure 5B:
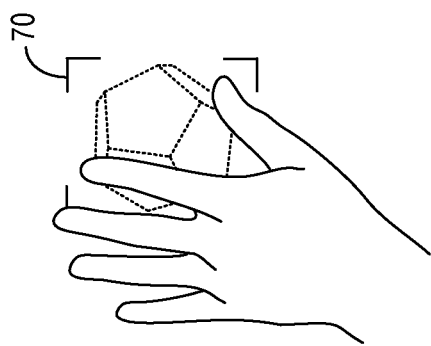
Figure 5C:
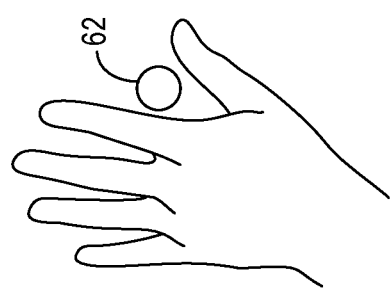
Figure 5D:
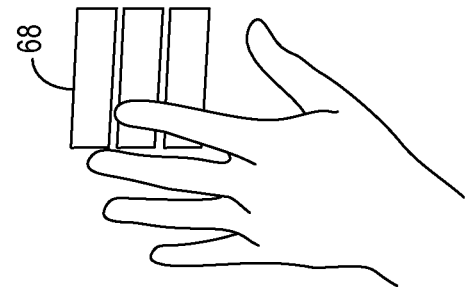
Figure 5E:
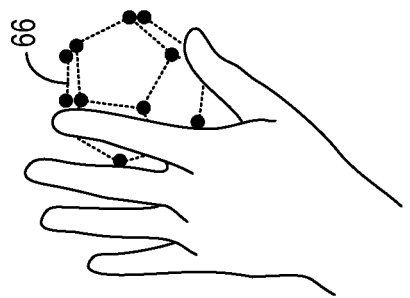
Figure 5F:
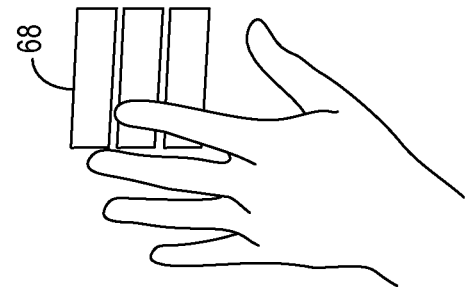

Turning now to FIGS. 4A-4C, the processor 12 may be further configured to, in the far interaction mode prior to receiving the trigger input 56 from the user, generate a virtual ray 60 from a hand of the user, the virtual ray 60 locked with respect to movement of the hand of the user. In the top representation of FIG. 4A, a virtual ray 60 is shown as originating from a hand of the user. The virtual ray 60 may extend into the VR or AR environment to a predetermined distance. As the user moves her hand, the virtual ray 60 may moves as directed by the user's hand. In response to the virtual ray 60 intersecting the virtual object 48 when moved by the hand of the user to do so, the processor 12 may also be configured to receive a user selection of the virtual object 48, the virtual object 48 being in the far interaction mode. For example, if the user holds the virtual ray 60 over the virtual object 48 for more than a predetermined threshold of time such as more than two seconds, the processor 12 may be configured to select the virtual object 48. Alternatively, the user may execute an extra step such as voicing the command "select" when the virtual ray 60 intersects the virtual object 48 in order to complete object selection. An example of selection of the virtual object 48 is given in the middle representation of FIG. 4B. Via the virtual ray 60, the processor 12 may be configured to execute control of the virtual object 48 according to gestures of the hand of the user. The trigger input 56 may be executed by the user with respect to the virtual ray 60 to invoke the near interaction mode and display the virtual interaction object 58 within the predetermined threshold distance 54 from the user. An example is given in the bottom representation of FIG. 4C. In this example, the user executes a predetermined gesture in the form of a pinch gesture as the trigger input 56, thus invoking the near interaction mode and initiating display of the virtual interaction object 58 within the predetermined threshold distance 54 from the user. It will be appreciated that the predetermined gesture may be a gesture other than a pinch gesture, such as a grab gesture, point gesture, tap gesture, etc.

In another implementation, in response to the virtual ray intersecting the virtual object 48 as a result of movement of the hand of the user, the processor 12 may be configured to generate a virtual handle 74 (sometimes referred to as a "handlebar") in the far interaction mode with respect to the virtual ray 60, the virtual handle 74 being in proximity to the hand of the user. The middle representation of FIG. 4B depicts this implementation, where a spherical node is generated as the virtual handle 74 when the virtual ray 60 intersects the virtual object 48. The processor 12 may be further configured to receive a gesture from the user at the virtual handle 74, the gesture being a trigger input 56. Again with reference to the bottom representation in FIG. 4C, the trigger input 56 is a pinch gesture, although other gestures may alternatively be used as discussed above.

As shown in FIGS. 5A-5F, the virtual interaction object 58 may be one of a plurality of different types of virtual interaction objects that the processor 12 is configured to generate. In addition, the trigger input 56 may be one of a plurality of possible trigger inputs 56, each of the possible trigger inputs 56 being a corresponding gesture, each gesture being associated with one virtual interaction object 58 of the plurality of virtual interaction objects 58. Some example trigger inputs 56 have been discussed, such as a pointed index finger of the user, a pinch gesture, a tap gesture, a grab gesture, and the like. The plurality of gestures may further include a pressing motion by a finger, a circular motion by the hand or a finger, a wrist flick, a rotation of the hand and/or arm, and/or a snap, to name a few additional examples. The plurality of virtual interaction objects 58 may include at least one of a pinchable object 62, handles 70 associated with the virtual object 48, at least one virtual button 64, a bounding box 72, a control widget 66, and a context menu 68, as shown in FIGS. 5A to 5F respectively.

As a further example, FIG. 6 shows the hand of a user that may be browsing virtual content such as a webpage on a two-dimensional page. A trigger input 56 may invoke display of at least one virtual button 64. In the example of FIG. 6, two virtual buttons 64 are shown that may be a scrolling mechanism for the virtual content. One advantage of this configuration may be that scrolling the virtual content at a distance beyond the user's reach may be difficult. The user, therefore, may invoke the near interaction mode as described above and generate display of the scrolling mechanism in proximity to the user's hand, thus easing the operation of scrolling the virtual content. In an additional example as shown in FIG. 7, a user may be working with one or more windows in a VR or AR environment. The user may desire to invoke a context menu 68. In this case, the user may execute a long press as the trigger input 56 so that a context menu is displayed as an affordance near the user's hand. It will be appreciated that the context menu 68 may be attached to the virtual object 48 that is the virtual window with which the user is interacting. An advantage of this configuration may be improved readability of the context menu 68 and greater ability to make fine movements/selections with respect to a virtual interaction object 58 (context menu 68) that is in proximity to the user's hand.

Figure 9:
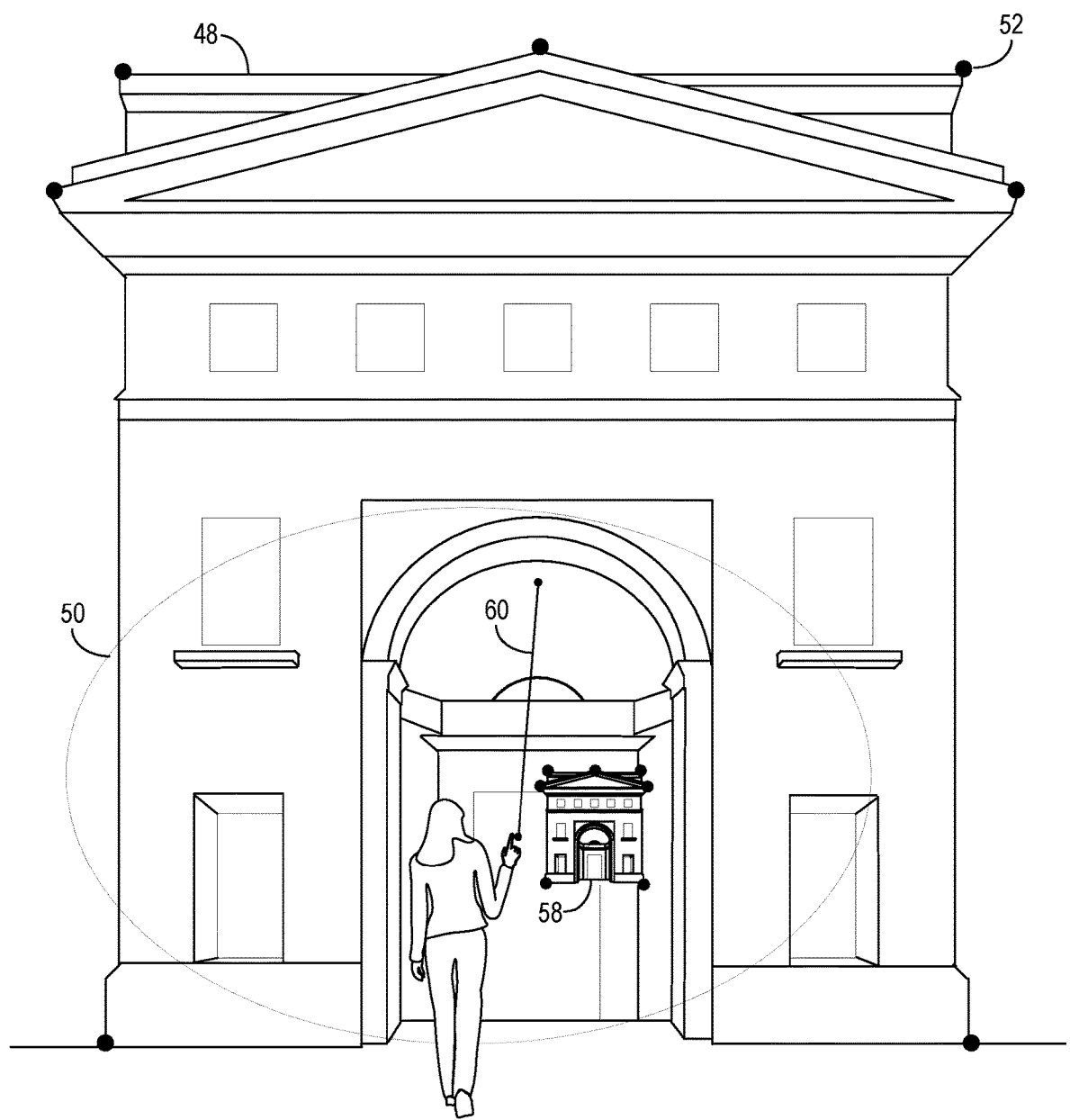
FIG. 9 shows a user interacting with the computing system of FIG. 1, according to another example of the present disclosure.

With reference to FIG. 8, the virtual object 48 may extend beyond the user's field of view 50 and at least one of the control points 52 associated with the virtual object 48 may be outside of the user's field of view 50. Also shown in FIG. 8 is another example of a trigger input 56, which in this instance is a pointing index finger motioning from a higher position to a lower position. It will be appreciated that the user may or may not access a virtual ray 60; that is, the processor 12 may be configured to recognize the trigger input 56 without generation of the virtual ray 60. The trigger input 56 may, for example, be interpreted by the processor 12 as assigned to a virtual object 48 that has the most control points 52 outside of the user's field of view 50. In an additional example shown in FIG. 9, a user may be approaching a large virtual object 48 in an AR environment, such as a vehicle or building as shown in FIG. 9. As the user comes closer to the virtual object 48, more control points 52 may be outside of the predetermined threshold distance 54. A potential advantage is that once the far interaction mode is invoked, the large virtual object 48 may be selected by the user to become a virtual interaction object 58 and thus be reduced in size for the convenience of the user. It will be appreciated that generation and display of virtual interaction object 58 may also happen automatically depending on the settings of the system 10 as more of the control points 52 are outside of the user's field of view 50 and/or the predetermined threshold distance 54.

The virtual interaction object 58 displayed within the predetermined threshold distance 54 from the user may be locked in location with respect the user. The predetermined threshold distance from the user may be in a range of 460 mm to 580 mm, typically as measured from the shoulder of the user. This distance represents an average distance from the shoulder of an average user to the grip center of a hand.

Figure 10:
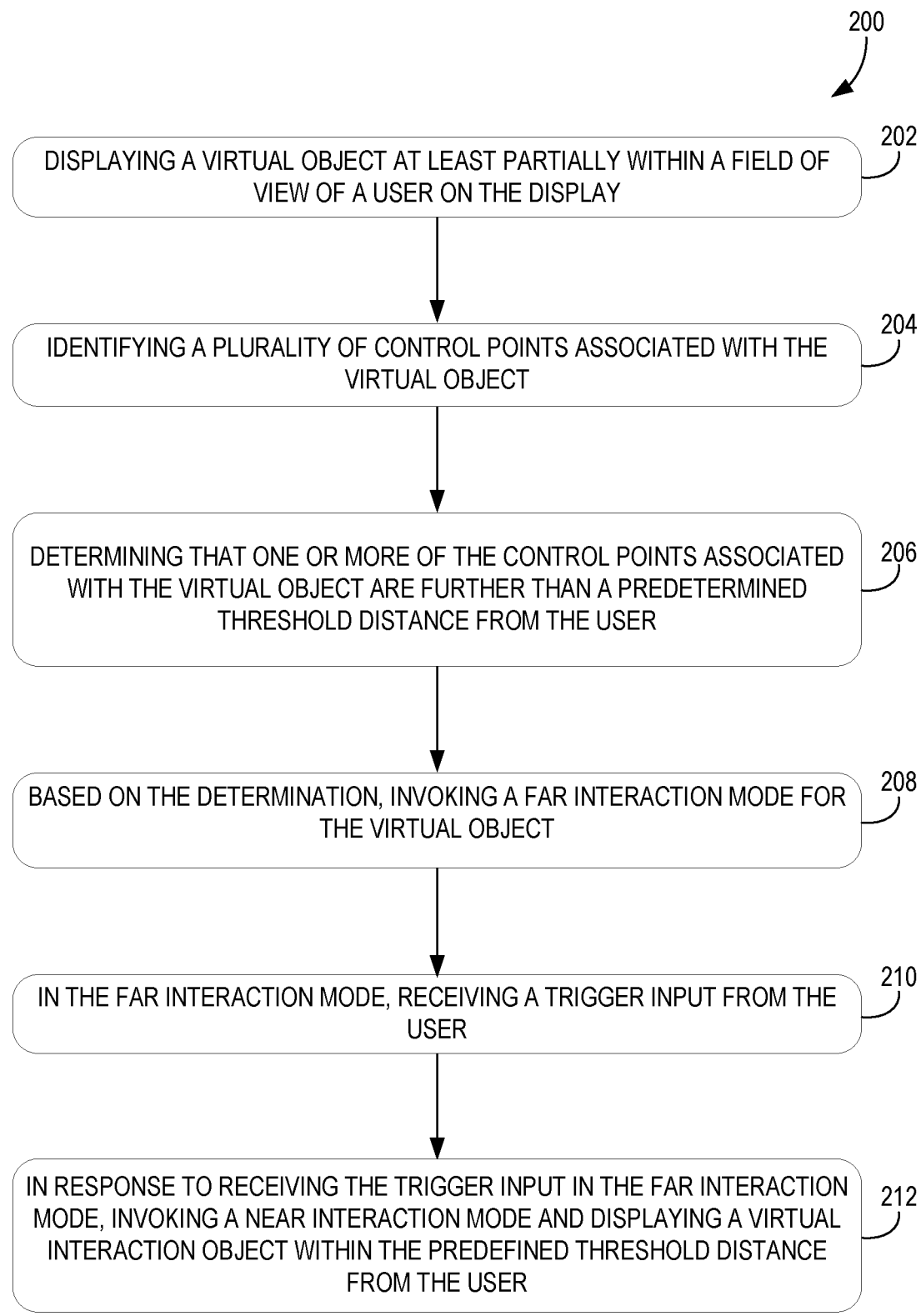
FIG. 10 is a flowchart of a method according to one implementation of the present disclosure.

FIG. 10 shows a flowchart of a method 200 for use with a computing device of the computing system 10. The following description of method 200 is provided with reference to the computing systems 10 described above and shown in FIG. 1. It will be appreciated that method 200 may also be performed in other contexts using other suitable components.

With reference to FIG. 10, the method 200 may be for use with an HMD device 14 including a processor 12 and a display 16. The method 200 at 202 may include displaying a virtual object 48 at least partially within a field of view 50 of a user on the display 14. At 204, the method 200 may include identifying a plurality of control points 52 associated with the virtual object 48. The method 200 at 206 may include determining that one or more of the control points 52 associated with the virtual object 48 are further than a predetermined threshold distance 54 from the user. At 208, the method 200 may include, based on the determination, invoking a far interaction mode for the virtual object 48. The method 200 at 210 may include, in the far interaction mode, receiving a trigger input 56 from the user. As shown in FIG. 1, the trigger input 56 may be detected by one of the sensors 29 in the HMD device 14. The trigger input 56 may include at least one of a predefined gesture, a vocal command, a gaze direction, and/or eye movement, and thus be detectable by outward facing cameras 32, microphone 34, or inward facing cameras 30, respectively. At 212 the method 200 may include, in response to receiving the trigger input 56 in the far interaction mode, invoking a near interaction mode and displaying a virtual interaction object 58 within the predetermined threshold distance 54 from the user. It will be appreciated that the virtual interaction object 58 displayed in the near interaction mode may be a control widget, for example in the form of a resized copy of the virtual object 48, and all control points 52 may be within the user's field of view 50 and within the predetermined threshold distance 54. Other forms of the virtual interaction object are possible as discussed above.

As discussed above, method 200 may also include, in the far interaction mode, prior to receiving the trigger input 56 from the user, generating a virtual ray 60 from a hand of the user, the virtual ray 60 locked with respect to movement of the hand of the user. In response to the virtual ray 60 intersecting the virtual object 48, the method 200 may include receiving a user selection of the virtual object 48. Via the virtual ray 60, the method 200 may include executing control of the virtual object 48 according to gestures of the hand of the user. Implementations of the virtual ray 60 are discussed above. The trigger input 56 may be executed by the user with respect to the virtual ray 60 to invoke the near interaction mode and display the virtual interaction object 58 within the predetermined threshold distance 54 from the user.

As discussed above, the virtual interaction object 58 may be one of a plurality of virtual interaction objects 58 that may be generated. The trigger input 56 may be one of a plurality of possible trigger inputs 56, each of the possible trigger inputs 56 being a corresponding gesture, and each gesture begin associated with one virtual interaction object 58 of the plurality of virtual interaction objects 58. The plurality of gestures may include a pressing motion by a finger, a circular motion by the hand or a finger, a wrist flick, a rotation of the hand and/or arm, and/or a snap, to name a few examples. The plurality of interaction objects 58 may include at least one of a pinchable object 62, handles 70 associated with the virtual object, at least one virtual button 64, a bounding box 72, a control widget 66, and a context menu 68, as shown in FIGS. 5A-5F.

With reference to FIGS. 8 and 9 as discussed above, the virtual object 48 may extend beyond the user's field of view 50 and at least one of the control points 52 associated with the virtual object 48 may be outside of the user's field of view 50. The virtual interaction object 58 displayed within the predetermined threshold distance 54 from the user may be locked in location with respect the user. The predetermined threshold distance from the user may be in a range of 460 mm to 580 mm. This distance represents an average distance from the shoulder of an average user to the grip center of a hand.

It will be appreciated that the computing system 10 may facilitate ease of interaction between a user and a virtual object 48. Potential advantages of the computing system 10 may include an improved ability for the user to make fine controls of the virtual object 48 and reduced muscle fatigue of the user. In general, the computing system 10 may provide greater intuitive and continuous interaction between the user and the virtual object 48.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
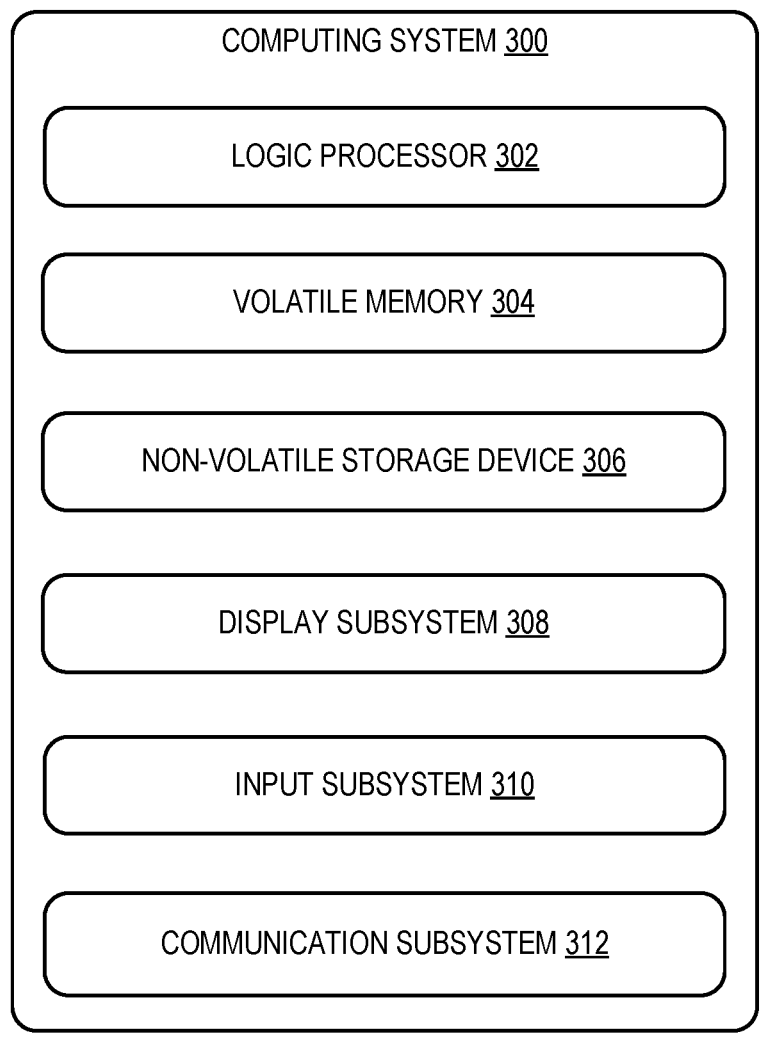
FIG. 11 is an example computing system according to an implementation of the present description.

FIG. 11 schematically shows a non-limiting embodiment of a computing system 300 that can enact one or more of the methods and processes described above. Computing system 300 is shown in simplified form. Computing system 300 may, for example, embody the system 12 of FIG. 1, or may instead embody some other computing system. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor 302 may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor 302 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 300 implemented to perform a particular function. In some cases, a program may be instantiated via logic processor 302 executing instructions held by non-volatile storage device 306, using portions of volatile memory 304. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device 306, and thus transform the state of the non-volatile storage device 306, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem 310 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 312 may be configured to communicatively couple computing system 300 with one or more other computing devices. Communication subsystem 312 may include wired and/or wireless communication devices compatible with one or more different communication protocols. As non-limiting examples, the communication subsystem 312 may be configured for communication via a wireless telephone network, or a wired or wireless local- or wide-area network. In some embodiments, the communication subsystem 312 may allow computing system 300 to send and/or receive messages to and/or from other devices via a network such as the Internet.

The following paragraphs provide additional support for the claims of the subject application. One aspect provides a computing system comprising a head mounted display (HMD) device including a display, a processor, and associated memory, the processor being configured to execute one or more programs stored in the memory to: display a virtual object at least partially within a field of view of a user on the display; identify a plurality of control points associated with the virtual object; determine that one or more of the control points associated with the virtual object are further than a predetermined threshold distance from the user; based on the determination, invoke a far interaction mode for the virtual object; in the far interaction mode, receive a trigger input from the user; and in response to receiving the trigger input in the far interaction mode, invoke a near interaction mode and display a virtual interaction object within the predetermined threshold distance from the user.

In this aspect, additionally or alternatively, the processor may be further configured to: in the far interaction mode, prior to receiving the trigger input from the user: generate a virtual ray from a hand of the user, the virtual ray locked with respect to movement of the hand of the user; in response to the virtual ray intersecting the virtual object, receive a user selection of the virtual object, the virtual object being in the far interaction mode; and via the virtual ray, execute control of the virtual object according to gestures of the hand of the user, wherein the trigger input may be executed by the user with respect to the virtual ray to invoke the near interaction mode and display the virtual interaction object within the predetermined threshold distance from the user.

In this aspect, additionally or alternatively, the virtual interaction object may be one of a plurality of virtual interaction objects that the processor is configured to generate, and the trigger input may be one of a plurality of possible trigger inputs, each of the possible trigger inputs being a corresponding gesture, each gesture being associated with one virtual interaction object of the plurality of virtual interaction objects. In this aspect, additionally or alternatively, the virtual interaction object may be one of a plurality of virtual interaction objects that the processor may be configured to generate, and the plurality of virtual interaction objects may include at least one of a pinchable object, handles associated with the virtual object, at least one virtual button, a bounding box, a control widget, and a context menu.

In this aspect, additionally or alternatively, the virtual object may extend beyond the user's field of view and at least one of the control points associated with the virtual object may be outside of the user's field of view. In this aspect, additionally or alternatively, the virtual interaction object displayed in the near interaction mode may be a resized copy of the virtual object and all control points may be within the user's field of view and within the predetermined threshold distance. In this aspect, additionally or alternatively, the trigger input may include at least one of a predefined gesture, a vocal command, a gaze direction, and eye movement. In this aspect, additionally or alternatively, the virtual interaction object displayed within the predetermined threshold distance from the user may be locked in location with respect to the user. In this aspect, additionally or alternatively, the predetermined threshold distance from the user may be in a range of 460 mm to 580 mm.

Another aspect provides a method for use with a head mounted display (HMD) device including a processor and a display, comprising: displaying a virtual object at least partially within a field of view of a user on the display; identifying a plurality of control points associated with the virtual object; determining that one or more of the control points associated with the virtual object are further than a predetermined threshold distance from the user; based on the determination, invoking a far interaction mode for the virtual object; in the far interaction mode, receiving a trigger input from the user; and in response to receiving the trigger input in the far interaction mode, invoking a near interaction mode and displaying a virtual interaction object within the predetermined threshold distance from the user.

In this aspect, additionally or alternatively, the method may further comprise, at the processor: in the far interaction mode, prior to receiving the trigger input from the user: generating a virtual ray from a hand of the user, the virtual ray locked with respect to movement of the hand of the user; in response to the virtual ray intersecting the virtual object, receiving a user selection of the virtual object; and via the virtual ray, executing control of the virtual object according to gestures of the hand of the user, wherein the trigger input may be executed by the user with respect to the virtual ray to invoke the near interaction mode and display the virtual interaction object within the predetermined threshold distance from the user.

In this aspect, additionally or alternatively, the virtual interaction object may be one of a plurality of virtual interaction objects that is generated, and the trigger input may be one of a plurality of possible trigger inputs, each of the possible trigger inputs being a corresponding gesture, each gesture being associated with one virtual interaction object of the plurality of virtual interaction objects. In this aspect, additionally or alternatively, the virtual interaction object may be one of a plurality of virtual interaction objects that is generated, and the plurality of virtual interaction objects may include at least one of a pinchable object, handles associated with the virtual object, at least one virtual button, a bounding box, a control widget, and a context menu.

In this aspect, additionally or alternatively, the virtual object may extend beyond the user's field of view and at least one of the control points associated with the virtual object may be outside of the user's field of view. In this aspect, additionally or alternatively, the virtual interaction object displayed in the near interaction mode may be a resized copy of the virtual object and all control points may be within the user's field of view and within the predetermined threshold distance. In this aspect, additionally or alternatively, the trigger input may include at least one of a predefined gesture, a vocal command, a gaze direction, and eye movement. In this aspect, additionally or alternatively, the virtual interaction object displayed within the predetermined threshold distance from the user may be locked in location with respect to the user. In this aspect, additionally or alternatively, the predetermined threshold distance from the user may be in a range of 460 mm to 580 mm.

Another aspect provides a computing system comprising: a head mounted display (HMD) device including a display; a processor and associated memory, the processor being configured to execute one or more programs stored in the memory to: display a virtual object at least partially within a field of view of a user on the display; identify a plurality of control points associated with the virtual object; e based on the determination, invoke a far interaction mode for the virtual object; generate a virtual ray from a hand of the user, the virtual ray locked with respect to movement of the hand of the user; in response to the virtual ray intersecting the virtual object as a result of movement of the hand of the user, generate a virtual handle in the far interaction mode with respect to the virtual ray, the virtual handle in proximity to the hand of the user; receive a gesture from the user at the virtual handle; and in response to receiving the gesture, invoke a near interaction mode and display a virtual interaction object within the predetermined threshold distance from the user.

In this aspect, additionally or alternatively, the virtual interaction object may be at least one user interface selected from the group consisting of handles associated with the virtual object, at least one virtual button, a scrolling mechanism for virtual content, a bounding box, a control widget including one or more of the control points, and a context menu.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing system, comprising:
a display;
a processor and associated memory, the processor being configured to execute one or more programs stored in the memory to:
  display a virtual object at least partially within a field of view of a user on the display;
  identify a plurality of control points associated with the virtual object;
  invoke a far interaction mode for the virtual object;
  in the far interaction mode, receive a trigger input from the user;
  in response to receiving the trigger input in the far interaction mode, invoke a near interaction mode and display a virtual interaction object including a copy of the one or more control points, wherein:
    the copy of the one or more control points is displayed nearer to the user than the virtual object and concurrently with display of the virtual object;
    the virtual interaction object is one of a plurality of virtual interaction objects that the processor is configured to generate; and
    the trigger input is one of a plurality of possible trigger inputs, each of the possible trigger inputs being a corresponding gesture, each gesture being associated with one virtual interaction object of the plurality of virtual interaction objects;
  receive a user interaction input performed by the user at the virtual interaction object; and
  execute control of the virtual object as specified by the user interaction input at the virtual interaction object.

2. The system of claim 1, the processor further configured to:
in the far interaction mode, prior to receiving the trigger input from the user:
generate a virtual ray from a hand of the user, the virtual ray locked with respect to movement of the hand of the user;
in response to the virtual ray intersecting the virtual object, receive a user selection of the virtual object, the virtual object being in the far interaction mode; and
via the virtual ray, execute control of the virtual object according to gestures of the hand of the user,
wherein the trigger input is executed by the user with respect to the virtual ray to invoke the near interaction mode and display the virtual interaction object within a predetermined threshold distance from the user.

3. The system of claim 1, wherein the virtual interaction object is one of a plurality of virtual interaction objects that the processor is configured to generate, and
the plurality of virtual interaction objects includes at least one of a pinchable object, handles associated with the virtual object, at least one virtual button, a bounding box, a control widget, and a context menu.

4. The system of claim 1, wherein the virtual object extends beyond the user's field of view and at least one of the control points associated with the virtual object are outside of the user's field of view.

5. The system of claim 1, wherein the virtual interaction object displayed in the near interaction mode is a resized copy of the virtual object and all control points are within the user's field of view and nearer to the user than the virtual object.

6. The system of claim 1, wherein the trigger input includes at least one of a predefined gesture, a vocal command, a gaze direction, and eye movement.

7. The system of claim 1, wherein the virtual interaction object is locked in location with respect to the user as the user moves.

8. The system of claim 1, wherein the one or more control points are displayed within a predetermined threshold distance from the user that is in a range of 460 mm to 580 mm.

9. A method for use with a computing device including a processor and a display, comprising:
displaying a virtual object at least partially within a field of view of a user on the display;
identifying a plurality of control points associated with the virtual object;
invoking a far interaction mode for the virtual object;
in the far interaction mode, receiving a trigger input from the user;
in response to receiving the trigger input in the far interaction mode, invoking a near interaction mode and displaying a virtual interaction object including a copy of the one or more control points, wherein:
the copy of the one or more control points is displayed nearer to the user than the virtual object, and concurrently with display of the virtual object;
the virtual interaction object is one of a plurality of virtual interaction objects that the processor is configured to generate; and
the trigger input is one of a plurality of possible trigger inputs, each of the possible trigger inputs being a corresponding gesture, each gesture being associated with one virtual interaction object of the plurality of virtual interaction objects;
receiving a user interaction input performed by the user at the virtual interaction object; and
executing control of the virtual object as specified by the user interaction input at the virtual interaction object.

10. The method of claim 9, further comprising, at the processor:
in the far interaction mode, prior to receiving the trigger input from the user:
generating a virtual ray from a hand of the user, the virtual ray locked with respect to movement of the hand of the user;
in response to the virtual ray intersecting the virtual object, receiving a user selection of the virtual object; and
via the virtual ray, executing control of the virtual object according to gestures of the hand of the user,
wherein the trigger input is executed by the user with respect to the virtual ray to invoke the near interaction mode and display the virtual interaction object within a predetermined threshold distance from the user.

11. The method of claim 9, wherein the virtual interaction object is one of a plurality of virtual interaction objects that is generated, and
the plurality of virtual interaction objects includes at least one of a pinchable object, handles associated with the virtual object, at least one virtual button, a bounding box, a control widget, and a context menu.

12. The method of claim 9, wherein the virtual object extends beyond the user's field of view and at least one of the control points associated with the virtual object are outside of the user's field of view.

13. The method of claim 9, wherein the virtual interaction object displayed in the near interaction mode is a resized copy of the virtual object and all control points are within the user's field of view and nearer to the user than the virtual object.

14. The method of claim 9, wherein the trigger input includes at least one of a predefined gesture, a vocal command, a gaze direction, and eye movement.

15. The method of claim 9, wherein the virtual interaction object is locked in location with respect to the user as the user moves.

16. The method of claim 9, wherein the one or more control points are displayed within a predetermined threshold distance from the user that is in a range of 460 mm to 580 mm.

17. A computing system, comprising:
a display;
a processor and associated memory, the processor being configured to execute one or more programs stored in the memory to:
display a virtual object at least partially within a field of view of a user on the display;
identify a plurality of control points associated with the virtual object;
invoke a far interaction mode for the virtual object;
generate a virtual ray from a hand of the user, the virtual ray locked with respect to movement of the hand of the user;
in response to the virtual ray intersecting the virtual object as a result of movement of the hand of the user, generate a virtual handle in the far interaction mode with respect to the virtual ray, the virtual handle in proximity to the hand of the user;
receive a gesture from the user at the virtual handle;

in response to receiving the gesture, invoke a near interaction mode and display a virtual interaction object including a copy of the one or more control points, wherein:
- the copy of the one or more control points is displayed nearer to the user concurrently with display of the virtual object;
- the virtual interaction object is one of a plurality of virtual interaction objects that the processor is configured to generate; and
- the gesture is one of a plurality of possible gestures, each gesture being associated with one virtual interaction object of the plurality of virtual interaction objects;

receive a user interaction input performed by the user at the virtual interaction object; and execute control of the virtual object as specified by the user interaction input at the virtual interaction object.

18. The system of claim 17, wherein
the virtual interaction object is at least one user interface selected from the group consisting of handles associated with the virtual object, at least one virtual button, a scrolling mechanism for virtual content, a bounding box, a control widget including one or more of the control points, and a context menu.

* * * * *